(12) United States Patent
Nam et al.

(10) Patent No.: US 8,072,185 B2
(45) Date of Patent: Dec. 6, 2011

(54) BATTERIES AND CHARGERS THEREFOR

(75) Inventors: Ki Y. Nam, Newport Beach, CA (US); Kenneth Tien Cao, Laguna Niguel, CA (US)

(73) Assignee: T3 Motion, Inc., Costa Mesa, CA (US)

( * ) Notice: Subject to any disclaimer, the term of this patent is extended or adjusted under 35 U.S.C. 154(b) by 909 days.

(21) Appl. No.: 12/053,226

(22) Filed: Mar. 21, 2008

(65) Prior Publication Data

US 2009/0237032 A1 Sep. 24, 2009

(51) Int. Cl.
*H01M 10/46* (2006.01)
(52) U.S. Cl. ....................................... 320/116
(58) Field of Classification Search .................. 320/106, 320/107, 112, 114, 116, 132, 149, 150
See application file for complete search history.

(56) References Cited

U.S. PATENT DOCUMENTS

| | | |
|---|---|---|
| 2004/0189248 A1* | 9/2004 | Boskovitch et al. .......... 320/116 |
| 2007/0080662 A1* | 4/2007 | Wu ............................... 320/110 |
| 2007/0273334 A1* | 11/2007 | Meyer et al. .................. 320/138 |

* cited by examiner

*Primary Examiner* — Edward Tso
(74) *Attorney, Agent, or Firm* — Blakely Sokoloff Taylor & Zafman LLP

(57) ABSTRACT

Batteries and battery monitoring and charging systems. The preferred battery has a plurality of rechargeable cells connected in series, first and second power terminals, each connected to a respective end of the series connection of rechargeable cells, a first connector for connecting to a battery charger, the first connector having connector contacts connected to each of the plurality of rechargeable cells, the first connector also having connector contacts coupled to a serial communication link, and a processor coupled to sense the voltage of each rechargeable cell and control the serial communication link for communication of rechargeable cell voltages when a charger is connected to the first connector. The charger communicates with the battery over the serial communication link to monitor cell temperature, and to charge each cell individually in a controlled manner. Various features and capabilities are disclosed.

25 Claims, 10 Drawing Sheets

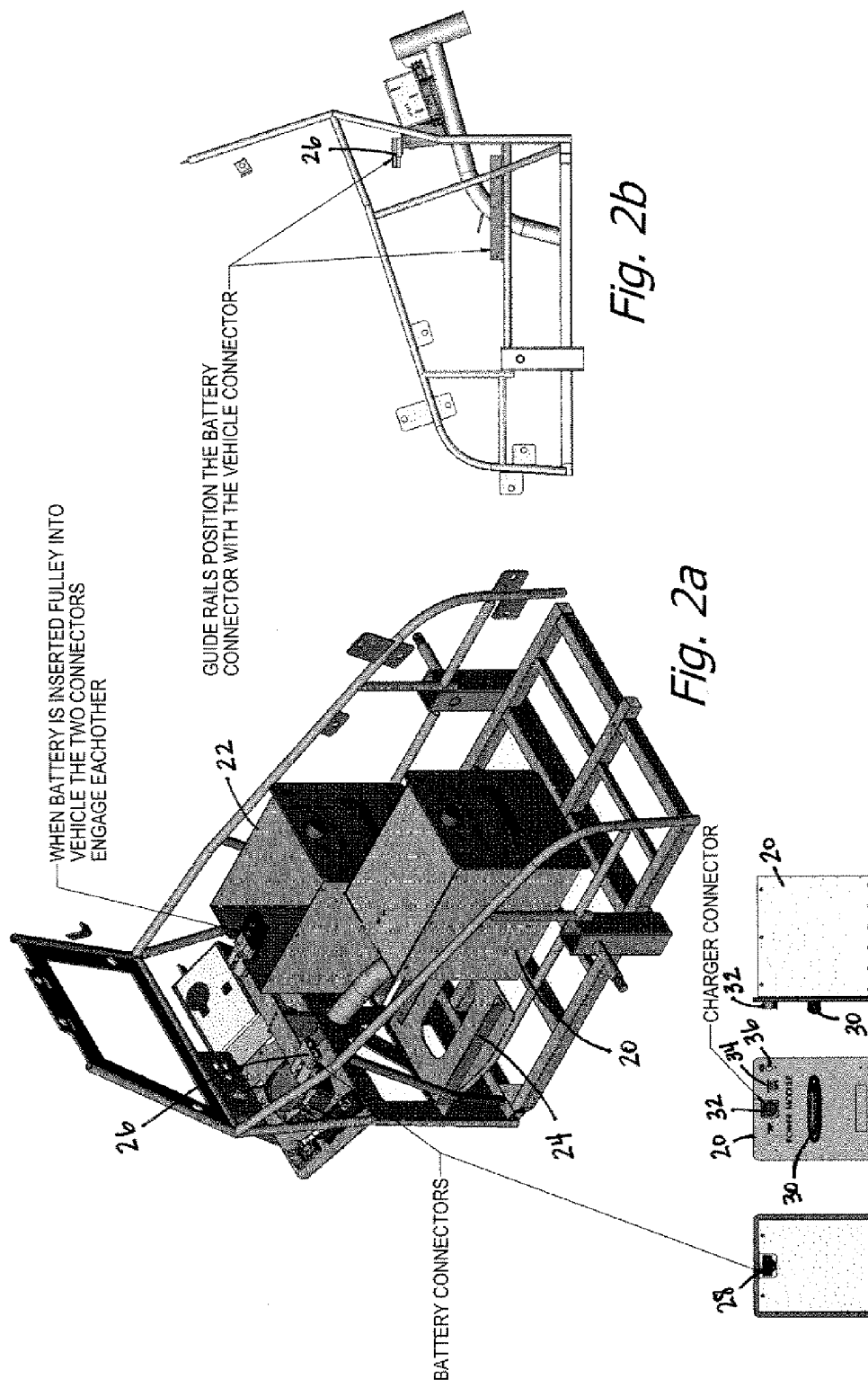

BATTERIES AND CHARGERS THEREFOR

BACKGROUND OF THE INVENTION

1. Field of the Invention

The present invention relates to the field of battery powered vehicles.

2. Prior Art

Battery powered vehicles of various sizes and designs are well known in the prior art. Of particular interest to the present invention are the smaller vehicles wherein the battery may be recharged in the vehicle or removed for recharging while another battery is placed in the vehicle so that the vehicle may be used while recharging occurs. One such vehicle is the three-wheeled vehicle shown in FIGS. 1a and 1b. This vehicle is manufactured by T3 Motion, Inc., assignee of the present invention.

In small electric powered vehicles using a removable rechargeable battery, the battery typically is recharged through its power output terminals, whether in the vehicle or removed from the vehicle for recharging. This provides a simple and low cost way of recharging such batteries, though has certain disadvantages. First, the power output terminals of the battery must be readily accessible, creating a possible safety hazard on the inadvertent shorting of those power terminals. Also batteries typically are comprised of multiple cells connected in series, so that individual cells cannot be monitored through its power output terminals. Accordingly, the general health of the battery, its rate of self discharge, etc. can only be monitored on an overall battery basis.

BRIEF DESCRIPTION OF THE DRAWINGS

FIGS. 2a through 2e are illustrations of a battery and its mounting in the vehicle of FIGS. 1a and 1b in accordance with the present invention.

DETAILED DESCRIPTION OF THE PREFERRED EMBODIMENTS

Figure 1A:
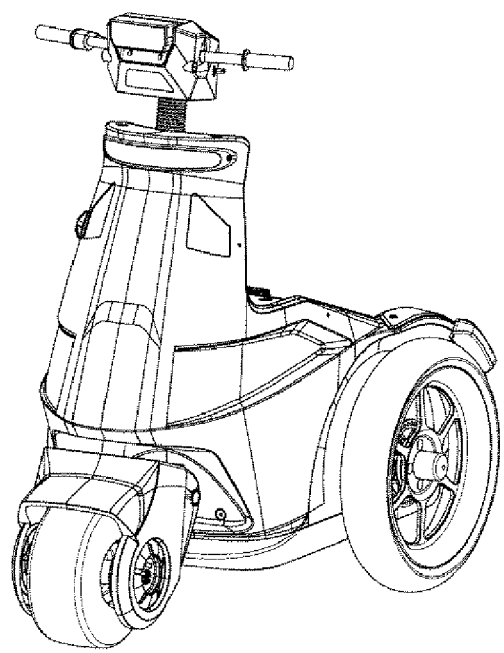
FIGS. 1a and 1b are views of a three wheeled electric vehicle in which the preferred embodiment of the present invention is used.
Figure 1B:
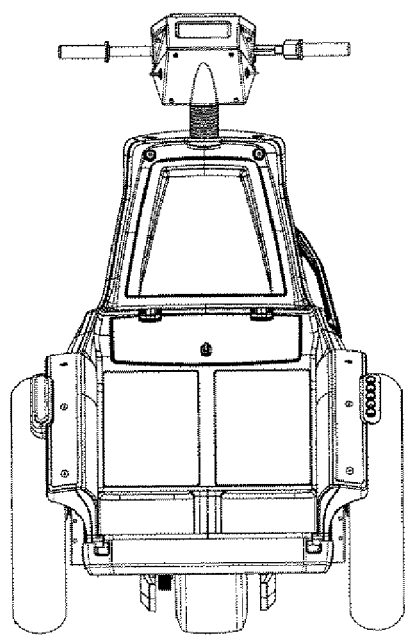

FIG. 2a is a perspective view of the chassis of the vehicle of FIGS. 1a and 1b, with FIG. 2b being a side view of the chassis. FIG. 2a shows a complete battery 20 and a battery container 22, the vehicle of FIGS. 1a and 1b using two batteries for the operation thereof. The batteries 20 are aligned and slide into the vehicle on guides 24, and when slid to their forward most position, make contact with connectors 26 fastened to the chassis. In that regard, a typical battery 20 may be seen in FIGS. 2c, 2d and 2e. FIG. 2c is a view of a battery from the back, FIG. 2d a front view of the battery and FIG. 2e a side view of the battery. It will be noted that the power connector 28 within the battery, as shown in FIG. 2c, does not project outward from the back of the battery as may be seen in FIG. 2e, but rather is recessed for protection and to avoid inadvertent shorting of the battery terminals and the hazards presented thereby. At the front of the battery 20 is a handle 30, a monitoring/recharging connector 32, three lighting emitting diodes (LEDs) 34 and a push button switch 36. Connector 32 in the present invention provides individual electrical connection to each cell in the battery, and further provides a serial communication link with a charger for control of the battery charging and monitoring the state of charge and health of the battery. As shall subsequently be seen, push button switch 36 may be used for checking the state of charge of the battery through LEDs 34 on the battery, even when a charger is not connected to the battery.

Figure 2F:
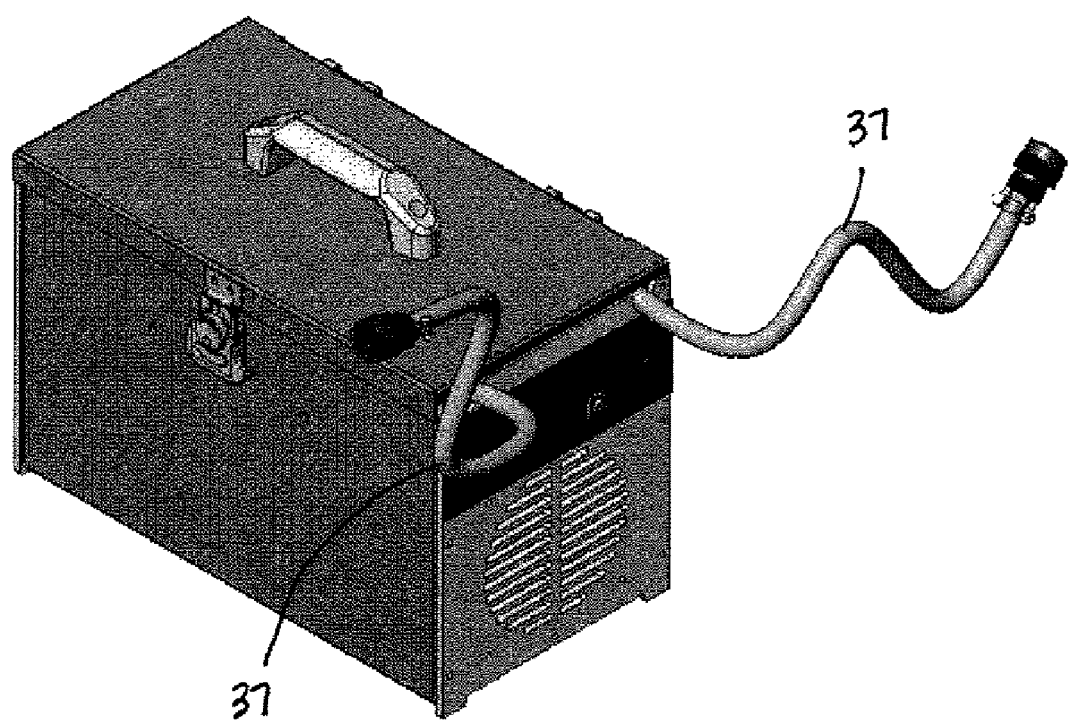
FIG. 2f is a perspective view of a battery charger in accordance with the present invention.

FIG. 2f is a perspective view of a battery charger in accordance with the present invention. The battery charger has two cables 37 for plugging into connectors 32 on two batteries 20 to charge up to two batteries at a time. The word charger as used hereafter is used in two contexts, first for a charger for an individual battery, and second, for a pair of such chargers as packaged together as in FIG. 2f.

Figure 3:
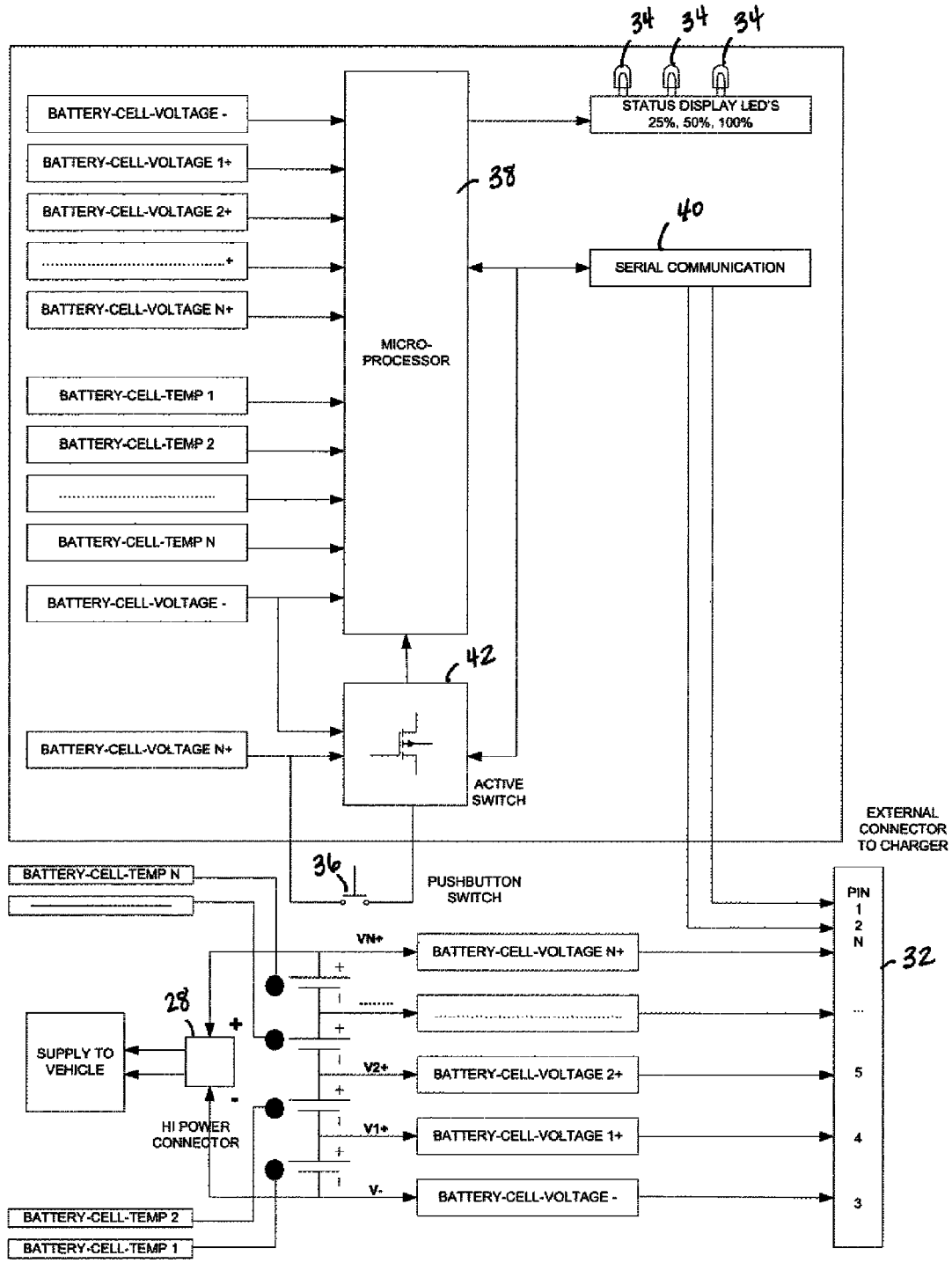
FIG. 3 is a block diagram of each battery of FIGS. 2a through 2e.

FIG. 3 is a block diagram of the battery circuit. The particular batteries used are four cell batteries, though of course this is not a limitation of the invention. A microprocessor 38 in the battery monitors the battery cell voltage for all four cells, the first connection shown being for the battery ground, the second connection being for the first cell voltage, and then each cell voltage thereafter being measured relative to the prior cell voltage. The microprocessor also monitors battery cell temperature using a temperature sensor or similar device, and provides this information to a serial communication link 40 for communication to and from the battery through connector 32 when connected to a battery charger. The battery cell terminals themselves are also connected to connector 32, in the embodiment shown through pins 3, 4, 5, 6 and 7, with the series connection of the batteries being connected to connector 28 in the battery for supplying power to the vehicle when charged and in the vehicle. The serial communication link 40 will control an active switch 42 which will cause the microprocessor to turn on and communicate with the charger when the charger is plugged in. As shall subsequently be seen, the charger also contains three status display LEDs, duplicating the display provided by LEDs 34 on the battery. When the charger is not plugged in, the battery status may be determined by pressing switch 36, which triggers microprocessor 38 on to power the status LEDs in accordance with the status as determined by the microprocessor. After approximately 15 to 20 seconds the microprocessor will shut off, of course turning off LEDs 34 and microprocessor 38 to save battery power. Not shown is a resistor in the battery, the resistance of which can be read by the charger over the serial communication link, the resistance being selected to indicate the battery chemistry for setting the recharging characteristics.

Figure 4A:
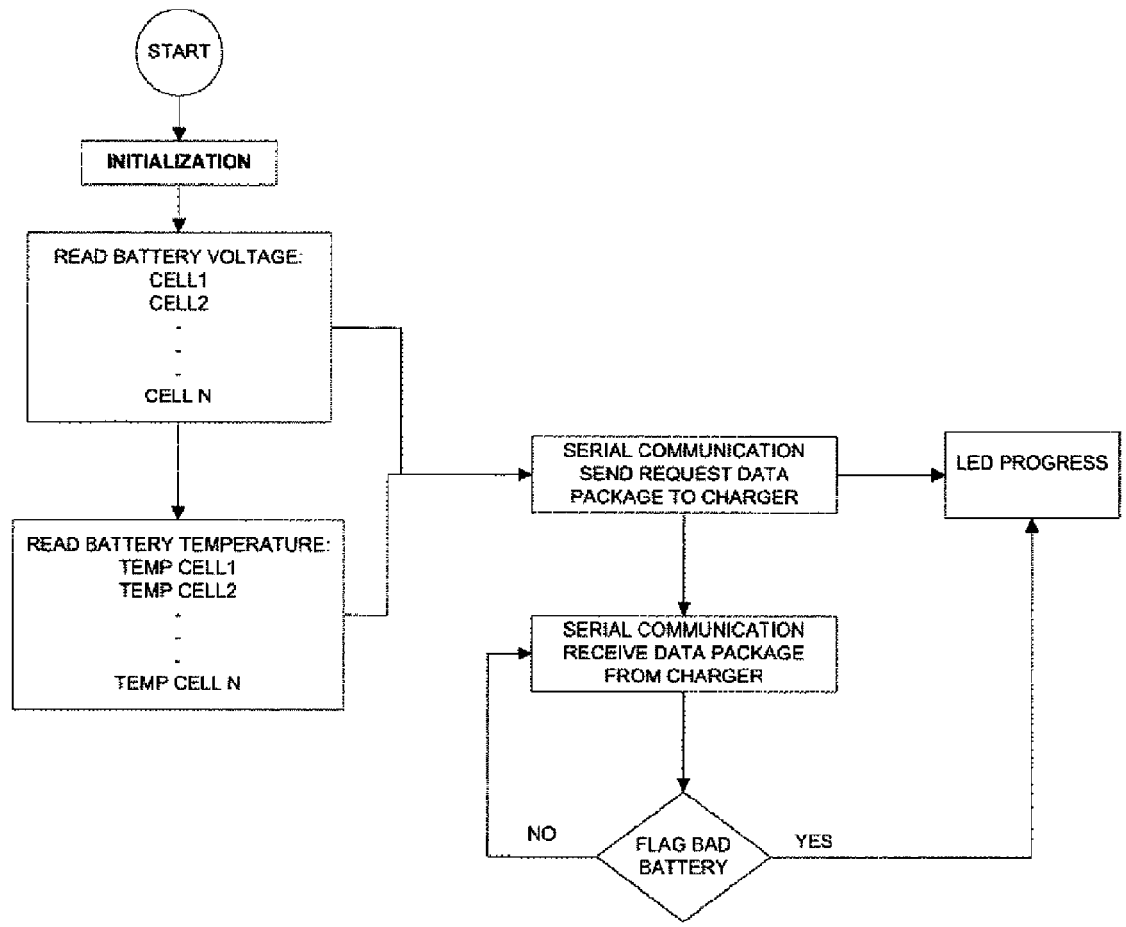
FIGS. 4a and 4b are battery control flow charts in accordance with the present invention.

Now referring to FIG. 4a, which is a flow chart for the battery control on the battery, when the microprocessor is started, there is first an initialization process, and then it proceeds to read the cell voltages and the cell temperatures. It will then set the state of the LEDs (LED progress) in accordance with those readings. If a charger is plugged in, it will send that data through the serial communication link to the charger and similarly receive a data package from the charger. If a bad battery is detected (bad or excessively discharged), the status of LEDs 34 on the battery is updated (LED progress) to indicate the bad battery.

Figure 4B:
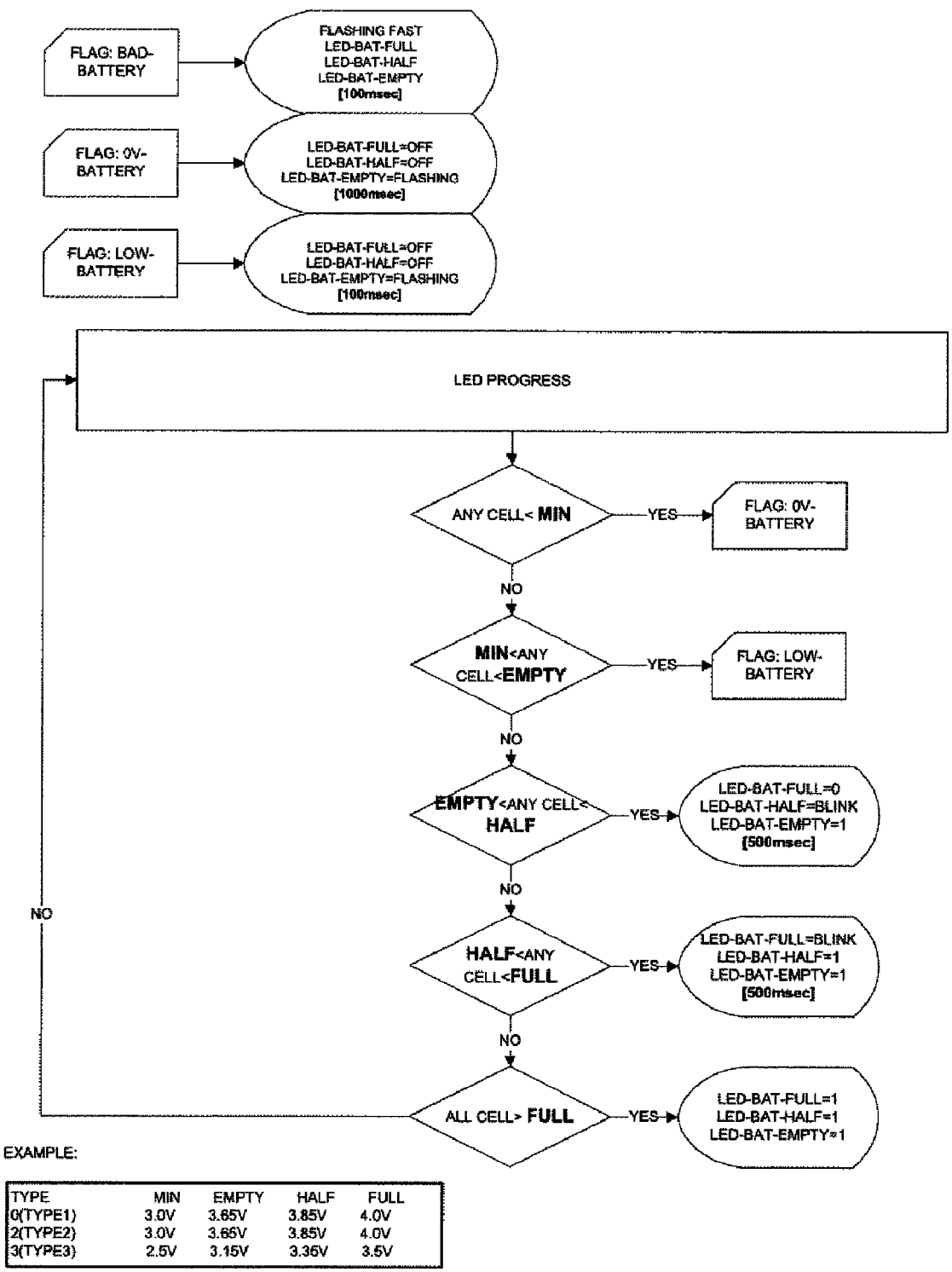

FIG. 4b is a flow chart illustrating the determination of the various battery states. For each type of battery used, a minimum voltage, an empty voltage, a half full or half charged voltage and a full or fully charged voltage for that type of battery is used. The empty voltage represents the low voltage of the battery's useful discharge cycle, the half full voltage represents a voltage at or above which the battery is considered to have a state of charge of at least 50%, and the full voltage is the voltage the battery is presumed to bed fully charged. The minimum voltage, on the other hand, is a voltage below the empty voltage, indicative not only of the discharge of the battery to below its useful voltage, but further indicative of a possible problem with the battery. Thus in the flow chart of FIG. 4b, all cells in the battery are tested to determine whether any are below the minimum (MIN) voltage, and if yes for any cell, the zero voltage battery flag is initiated. As shown at the top of the Figure, this is indicated on the battery LEDs by having the full and half full LEDs off and the empty LED flashing in one second intervals. If no cells are below the minimum, the cell voltages are then tested to determine if any of the cells are above the minimum voltage but less than the empty voltage. If they are, the low battery flag is initiated. This flag turns the full LED and half full LED off and the empty LED flashing, though now flashing in 100 millisecond intervals rather than one second intervals. If none of the cells are between the minimum voltage and the empty voltage, they are then tested to determine if they are between empty and half full. If yes, the full LED will be off, the half full LED will blink in half second intervals and the empty LED will be on, indicating that the battery is more than empty though less than half full. If none of the cells fall between the empty and the half full voltage, the voltage readings are then tested to determine whether any cell is between the half full and full voltage. If so, the full diode will blink in half second periods, the half full diode will be on and the empty LED will be on. Finally if none of the cells fall between half full and full, then all cells must be fully charged, and accordingly all three LEDs are turned on. Note of course in this sequence, as soon as one of the conditions has been found, the sequence stops at that point to power the LEDs accordingly. Also of course if a battery charger is connected, the serial I/O connection will report the same to the charger. Thus, for instance, if in a four cell battery, three cells are fully charged, but a weak cell is between empty and half charged, the LEDs will indicate the state of the battery as being between empty and half charged, though because the voltage of each cell will be communicated to the charger, the charger will have the information to determine which cell is the errant cell.

Figure 5:
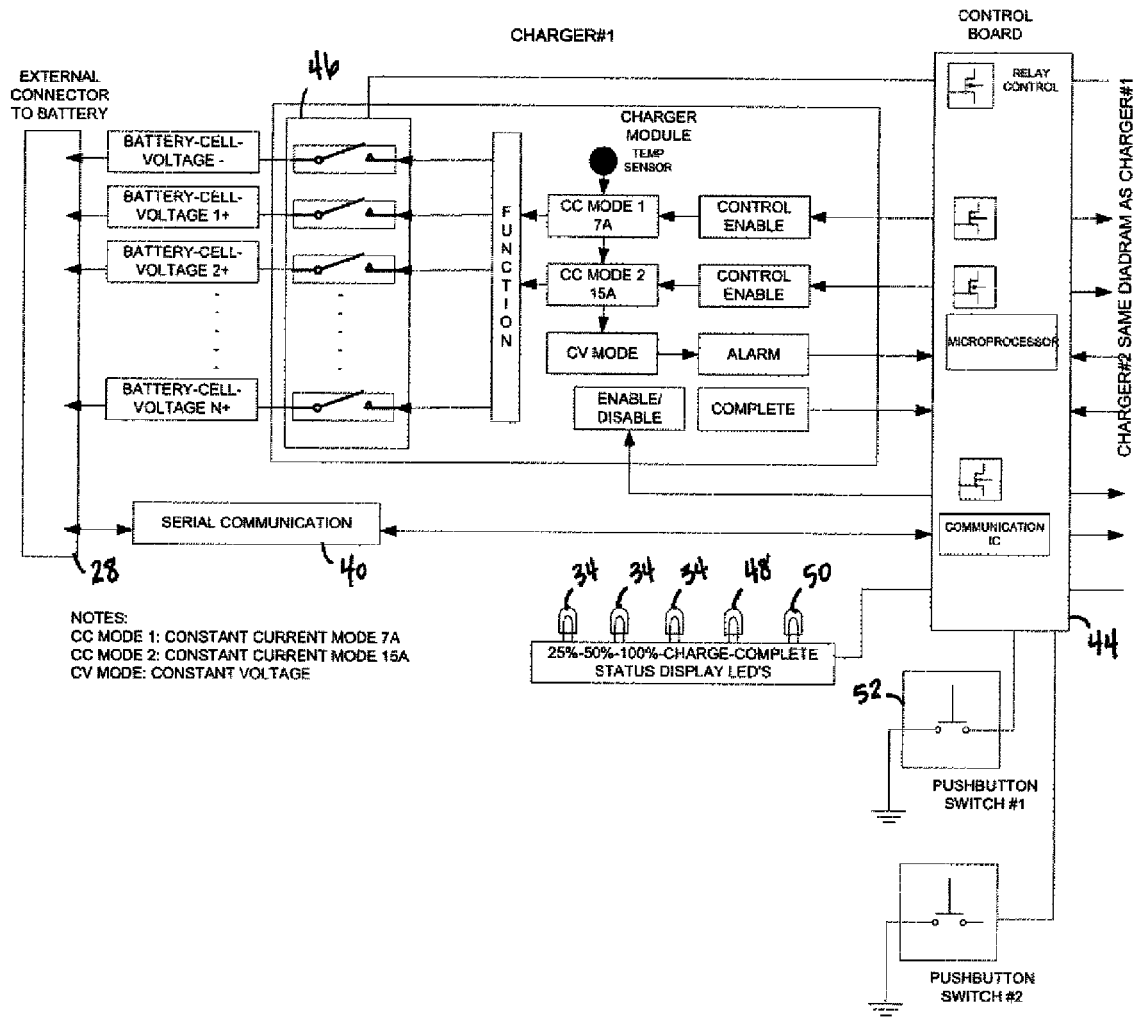
FIG. 5 is a charger block diagram for each of the two chargers in the charger of FIG. 2f.

Now referring to FIG. 5, an overall block diagram of a battery charger in accordance with the present invention may be seen. In this diagram, only the control elements are shown, with the power elements, which may be of conventional design, being omitted for clarity. The charger is controlled by a microprocessor control board 44. The microprocessor control board 44 controls the charger under program control by controlling the connection of the charger to the cells through relays 46, and controlling the charging mode of each cell based on information obtained from the battery over the serial communication link. In the preferred embodiment, there are three charging modes used, identified as CC MODE 1, CC MODE 2 and CV MODE. CC MODE 1 is a low constant current mode, 7 amps in the preferred embodiment, CC MODE 2 is a high constant current mode, 15 amps in the preferred embodiment, with CV MODE being a constant voltage charging mode representing the charging voltage limit for the 15 amp charging rate, the specific constant voltage used depending on the type (chemistry) of battery being charged.

Any of these three charging modes may be applied to the cells in a battery through relays 46, though in the preferred embodiment, the same mode is applied to all cells of a battery, with the voltage of the lowest voltage cell determining the mode. In addition, the microprocessor may communicate with a battery connected to the connector 28 through the serial communication link 40, and is configured to indicate not only that charging is in progress through LED 46 or finished through LED 48, but also to indicate the state of charge of the battery through diodes 34, replicating the indication on the battery itself. The charger can be activated by push button switch 52, and once activated, will normally continue until all cells are fully charged, then disconnect the charger from the battery through relays 46 and continue to monitor the state of charge of the battery through the serial communication link. There is also an auto enable mode, wherein the charger will sense the presence of a battery on the charger, provided the battery has a sufficient voltage for serial communication with the charger. Push button switch 52 is also used to wake the battery up when the battery is very low capacity or completely drained.

Figure 6:
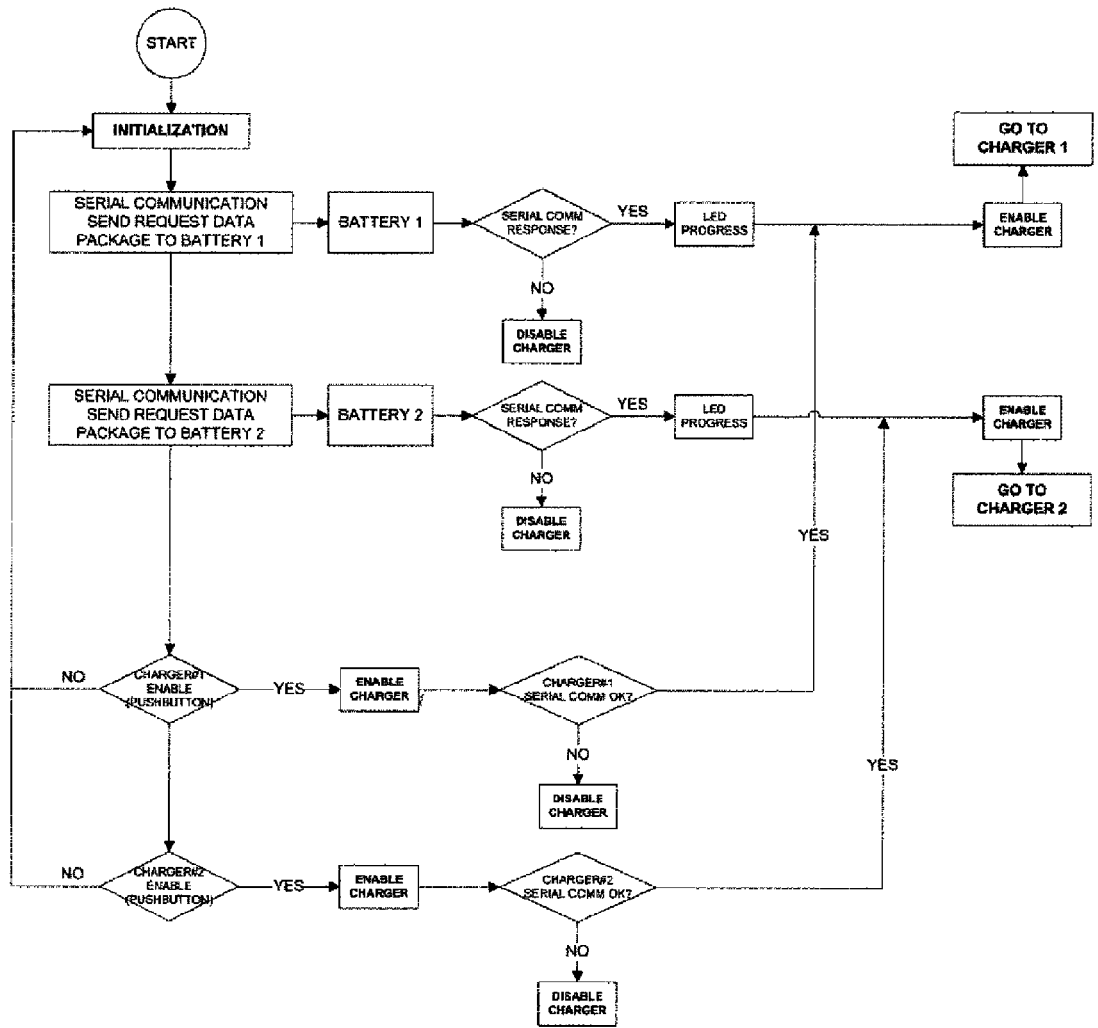
FIGS. 6, 7 and 8 are charger control flow charts in accordance with the present invention.
Figure 7:
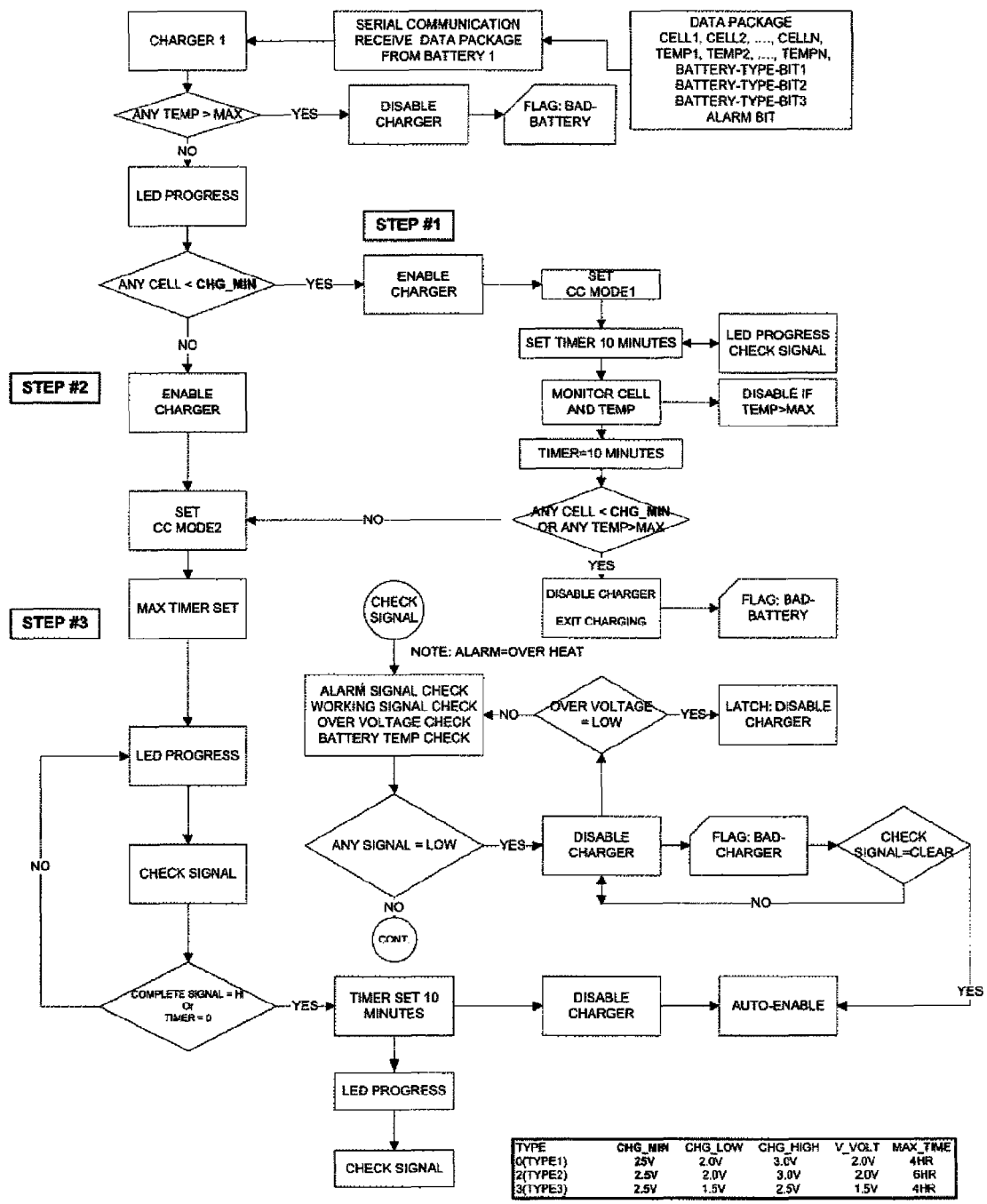

Now referring to FIG. 6, part of the charger control flowchart for a charger in accordance with a preferred embodiment may be seen. Since the vehicle of FIG. 1 uses two batteries, the charger of the preferred embodiment is also capable of charging two batteries at the same time. It is, of course, also capable of charging only a single battery at a time, which may be connected to either port of the charger. When power is supplied to the charger (START), the charger goes through an initialization process and then sends a request for data to the first battery connection. If there is no battery connected to that charger connection, or alternatively the battery that is connected is too dead to reply, the charger for that battery is disabled. If a reply is received from the battery, the LEDs on that charger and battery are updated to indicate that the battery is being charged and the present state of charge of the battery, and the charger is then enabled with the logic flow then proceeding as identified as sequence 1 (FIG. 7). Whether or not the charger for battery 1 was enabled, the charger then goes through the same process for battery 2. Note that in either case, if no battery is connected to the charger, or alternatively the battery is too dead to respond, the charger for that battery will believe no battery is connected and accordingly will not begin the charging sequence. The charger will also check to see if either charger, Charger 1 for the first battery or Charger 2 for the second battery, has been turned on by control switches on the battery charger (charger #1 enable pushbutton and charger #2 enable pushbutton). If the switch for either battery has been turned on, the respective charger is enabled and another serial communication with the battery is attempted. If a battery is connected, the charger will sense the presence of the battery by sensing the charger current. Given a battery present, the charger will then go to sequence 1 or sequence 2, or both, to charge one or both batteries. As long as the charger itself has power, it will repeat the test to sense when a battery is connected to the charger, if not too dead, or when a charger is manually turned on. As described, sequence 1 and sequence 2 are identical sequences and accordingly only sequence 1 will be described herein in detail.

Sequence 1 (and/or sequence 2) begins with a communication from the battery of the battery cell voltages and temperatures as well as battery type, which the charger then uses to update the LEDs on the charger to indicate that status. Even if the communication with the battery is unsuccessful, the charger proceeds with sequence 1. The cells of the battery are tested to see if any cell is above the maximum temperature allowed, and if so, the charger is disabled and a bad battery is flagged. If not, the cells of the battery are then tested to see if any cell is below the minimum charge, and if yes, the charger is enabled and set to the CC mode 1 (7 amps) to charge the cells for 10 minutes, after which the cells are again tested to determine if any cell is below the minimum charge. The 10 minutes should be adequate to bring the voltage of any properly operating cell to above the minimum voltage. If it doesn't, the charger is disabled and the bad battery flag activated. If none of the cells are below the minimum voltage, or at least are no longer below the minimum voltage after the 10 minutes, the charger is set to CC mode 2 and the maximum timer set to a time more than adequate to charge a properly functioning battery. The LEDs are updated and the charger signals checked. If the check signal indicates 1) an alarm signal (overheating), 2) a working signal at zero volts (charger fault), 3) a cell temperature above the maximum allowable temperature, or 4) over voltage charging above the maximum allowable voltage (charger fault), the charger is disabled and a bad charger flag is activated. If over voltage charging occurs, the charger is latched in the disable mode until the charger is recycled through the AC switch. Otherwise the LEDs will be continually updated, either until the battery is fully charged or the maximum timer times out. Of course the CC mode 2 will charge the cells at 15 amps, but will reduce the charging rates as each cell reaches the CV mode. Once all cells are fully charged or the timer has timed out, the battery is allowed to sit without charging for 10 minutes to stabilize, within which time a faulty cell will show itself by an extraordinarily high self discharge rate. During the 10 minutes, the LEDs indicating the state of the battery charge are updated, with the charger being disabled at the end of the 10 minutes and going into an auto enable mode. During the entire charging process, the cell temperatures are monitored, and if the temperature of any cell exceeds the maximum allowed, the charger is disabled and a bad battery flagged.

Figure 8:
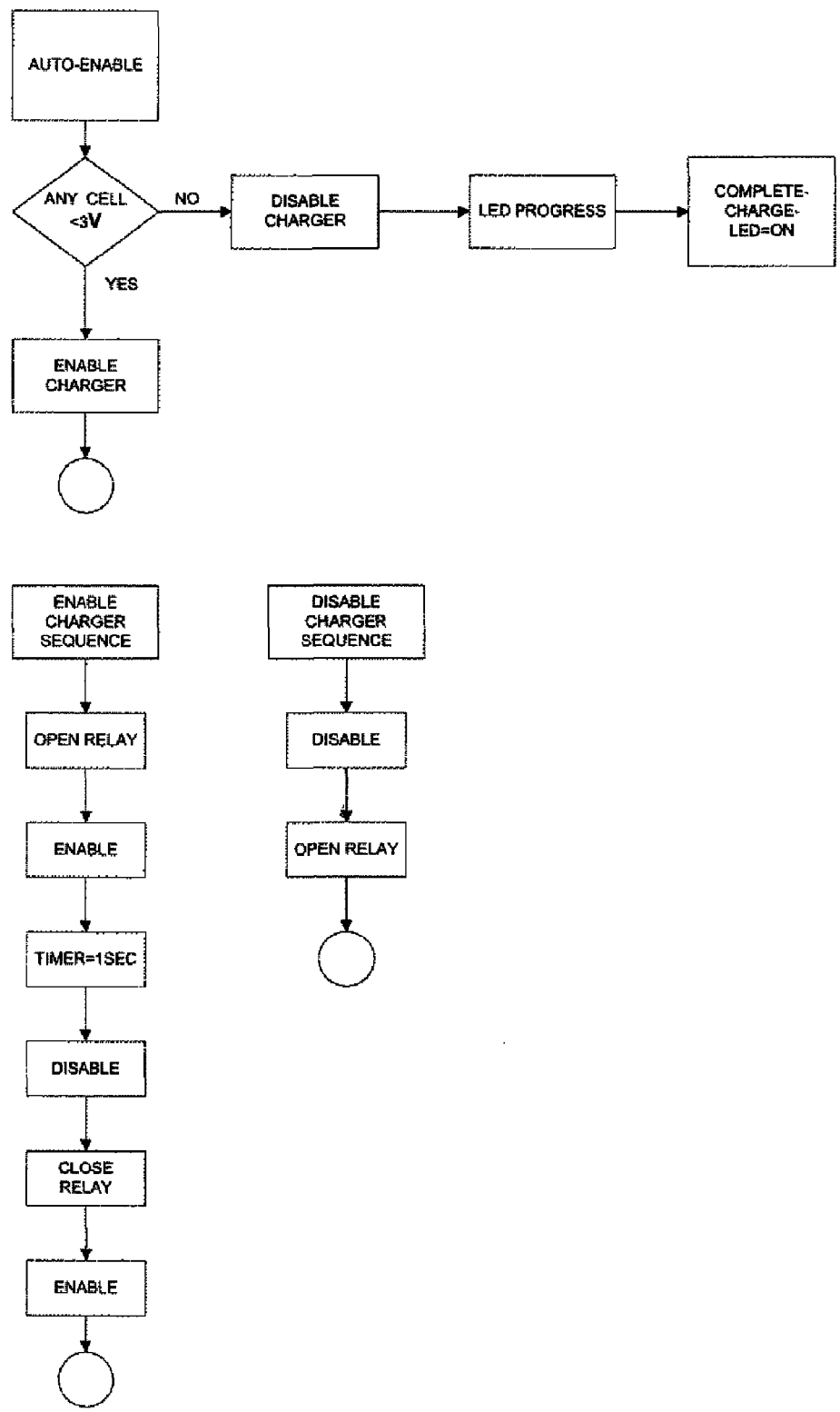

The auto enable mode is shown in FIG. 8. In the auto enable mode the charger will periodically test any cell to see if its voltage has fallen below 3 volts. If it has not, it will disable the charger and update the status of the LEDs on the charger to turn on the complete charge LED. If the voltage on a cell has fallen below 3 volts (depending on battery chemistry), the charger for that battery is then turned on and the charger returns to sequence 1 or 2, identical sequences with sequence 1 being shown in FIG. 7.

As shown in FIG. 5, charger #1 has five LEDs (for each battery and charger) to indicate charger and battery status. LED 48 on indicates that the battery is being charged, and LED 50 on indicates the battery is fully charged. A bad battery is flagged by all of LEDs 34 flashing. A bad charger (over heat and over voltage) is flagged by LEDs 48 and 50 flashing. The LEDs 34, full half and empty) are used to indicate any of four battery states of charge for batteries not flagged as bad. These states of charge, duplicated by the LEDs on the battery itself, and sensed by cell voltages, are battery full (fully charged), between half full and full, between empty and half full, and between a minimum voltage and empty. Below the minimum voltage the battery is flagged as a bad battery. Empty means that the battery has reached its defined useful state of discharge and should be recharged. Between the minimum voltage and empty, the state of charge is flagged by the full and half LEDs 34 being off and the empty LED flashing. Between the empty and half full, the state of charge is flagged by the full LED 34 being off, the half LED flashing and the empty LED being on. Between the half full and full, the state of charge is flagged by the full LED 34 flashing and the half and empty LEDs being on. When full, all three LEDs 34 will be turned on. As shown in FIG. 5, charger #2 is the same configuration as charger #1. Charger #1 and charger #2 are independently controlled by the microprocessor.

In a specific example disclosed herein, the battery is a four rechargeable cell battery, and thus the battery charger accommodates the charging of four cells per battery. Of course the batteries and chargers in accordance with the present invention may also be configured for more or less cells, as desired.

The present invention, the preferred embodiment of which has been described, has a number of aspects, which aspects may be practiced alone or in various combinations or subcombinations, as desired. While a preferred embodiment of the present invention has been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A battery comprising:
   a plurality of rechargeable cells connected in series;
   first and second power terminals, each connected to a respective end of the series connection of the rechargeable cells;
   a first connector for connecting to a battery charger, the first connector having connector contacts connected to each of the plurality of rechargeable cells;
   the first connector also having connector contacts coupled to a serial communication link;
   a processor coupled to sense the voltage of each rechargeable cell and control the serial communication link for communication of rechargeable cell voltages when a charger is connected to the first connector.

2. The battery of claim 1 wherein the microprocessor is also configured to communicate battery type over the serial communication link.

3. The battery of claim 1 wherein the microprocessor is also configured to sense rechargeable cell temperatures and communicate rechargeable cell temperatures over the serial communication link.

4. The battery of claim 1 further comprising a manually operated switch and a plurality of LEDs, the manually operated switch causing the microprocessor to sense rechargeable cell voltages and provide an indication of the state of charge of the rechargeable cells through illumination of the LEDs.

5. The battery of claim 1 wherein the first and second power terminals comprise a second connector.

6. The battery of claim 5 wherein the second connector is disposed in the battery so as to electrically engage a cooperatively disposed connector in a battery powered vehicle as the battery is slid into place in the battery powered vehicle.

7. The battery of claim 6 wherein the first and second connectors are disposed on opposite sides of the battery.

8. The battery of claim 1 further comprised of a battery charger, the battery charger having at least one cable and connector for connecting to the first connector on a battery, and when connected to a battery, the battery charger being adapted to communicate with the battery over the serial communication link, and provide a charging current to each rechargeable cell of the battery based on rechargeable cell state of charge.

9. The battery of claim 1 wherein the microprocessor is also configured to communicate battery type over the serial communication link, and further comprised of a battery charger, the battery charger having at least one cable and connector for connecting to the first connector on a battery, and when connected to a battery, the battery charger being adapted to communicate with the battery over the serial communication link, and provide a charging current to each rechargeable cell of the battery dependent on battery type and rechargeable cell state of charge.

10. The battery of claim 1 wherein the microprocessor is also configured to sense rechargeable cell temperatures and communicate rechargeable cell temperatures over the serial communication link, and further comprised of a battery charger, the battery charger having at least one cable and connector for connecting to the first connector on a battery, and when connected to a battery, the battery charger being adapted to communicate with the battery over the serial communication link, and terminate charging current to each rechargeable cell when any rechargeable cell is above a rechargeable cell temperature limit.

11. The battery of claim 1 further comprised of a battery charger, the battery charger having at least one cable and connector for connecting to the first connector on a battery, and when connected to a battery, the battery charger being adapted to communicate with the battery over the serial communication link and provide a first charging current for a first predetermined charging time if at least one rechargeable cell voltage is below a first predetermined voltage, to provide a second charging current if all rechargeable cells are above the first predetermined voltage but at least one rechargeable cell is below a second predetermined voltage, to limit the maximum charging voltage on any rechargeable cell to a predetermined voltage, and to stop charging after all rechargeable cells reach a predetermined voltage or a second predetermined charging time expires.

12. The battery of claim 11 wherein the charger stops its charging cycle if after the first predetermined charging time, a rechargeable cell voltage is still below the first predetermined voltage.

13. The battery of claim 1 wherein the microprocessor is also configured to sense rechargeable cell temperatures and communicate rechargeable cell temperatures over the serial communication link, and further comprised of a battery charger, the battery charger having at least one cable and connector for connecting to the first connector on a battery, and when connected to a battery, the battery charger being adapted to communicate with the battery over the serial communication link and provide a first charging current to each rechargeable cell for a predetermined period of time if at least one rechargeable cell voltage is below a first predetermined voltage, to provide a second charging current to each rechargeable cell if all rechargeable cells are above the first predetermined voltage but at least one rechargeable cell is below a second predetermined voltage, to limit the charging voltage to any rechargeable cell to a predetermined maximum voltage, and to stop charging after all rechargeable cells reach a predetermined voltage or a predetermined charging time expires, the battery charger monitoring rechargeable cell temperatures and stopping charging of all rechargeable cells if a rechargeable cell temperature exceeds a predetermined temperature.

14. A battery charger having at least one cable and connector for connecting to a connector on a battery, and when connected to a battery, the battery charger being adapted to communicate with a battery over a serial communication link to determine rechargeable cell voltages for each rechargeable cell in a battery, and provide a charging current to each rechargeable cell of a battery responsive to its voltage.

15. The battery charger of claim 14, the battery charger when connected to a battery being adapted to communicate with a battery over the serial communication link to determine battery type, and provide a charging current to each rechargeable cell of a battery dependent on battery type.

16. The battery charger of claim 14 wherein the battery charger is configured to sense rechargeable cell temperatures over the serial communication link, and terminate charging currents if any rechargeable cell temperature is over a temperature limit.

17. The battery charger of claim 14, the battery charger when connected to a battery being adapted to communicate with a battery over the serial communication link and provide a first charging current for a first predetermined charging time to each rechargeable cell if at least one rechargeable cell voltage is below a first predetermined voltage, to provide a second charging current if all rechargeable cells are above the first predetermined voltage but at least one rechargeable cell is below a second predetermined voltage, to limit the charging voltage to all rechargeable cells to a predetermined maximum voltage, and to stop charging after all rechargeable cells reach a predetermined voltage or a second predetermined charging time expires.

18. The battery charger of claim 17 wherein the charger stops its charging cycle if after the first predetermined charging time, at least one rechargeable cell voltage is still below the first predetermined voltage.

19. The battery charger of claim 14, the battery charger being adapted to communicate with a battery over the serial communication link and provide a first charging current for a predetermined period of time if at least one rechargeable cell voltage is below a first predetermined voltage, to provide a second charging current if all rechargeable cells are above the first predetermined voltage but at least one rechargeable cell is below a second predetermined voltage, to limit the charging voltage for each rechargeable cell to a predetermined maximum charging voltage, and to stop charging after all rechargeable cells reach a predetermined voltage or a predetermined charging time expires, the battery charger monitoring rechargeable cell temperatures and stopping charging if a rechargeable cell temperature exceeds a predetermined temperature.

20. A battery and charger comprising:
  a battery having:
    a plurality of rechargeable cells connected in series;
    first and second power terminals, each connected to a respective end of the series connection of the rechargeable cells;
    a first connector for connecting to a battery charger, the first connector having connector contacts connected to each of the plurality of rechargeable cells;
    the first connector also having connector contacts coupled to a serial communication link;
    a processor coupled to sense the voltage of each rechargeable cell and control the serial communication link for communication of rechargeable cell voltages when a charger is connected to the first connector; and
  a battery charger, the battery charger having;
    at least one cable and connector for connecting to the first connector on a battery, and when connected to a battery, the battery charger being adapted to communicate with the battery over the serial communication link and provide a first charging current for a first predetermined charging time if at least one rechargeable cell voltage is below a first predetermined voltage, to provide a second charging current if all rechargeable cells are above the first predetermined voltage but at least one rechargeable cell is below a second predetermined voltage, to limit the maximum charging voltage on any rechargeable cell to a predetermined voltage, and to stop charging after all rechargeable cells reach a predetermined voltage or a second predetermined charging time expires.

21. The battery of claim 20 wherein the charger stops its charging cycle if after the first predetermined charging time, a rechargeable cell voltage is still below the first predetermined voltage.

22. A battery and battery charger comprising:
a battery having;
- a plurality of rechargeable cells connected in series;
- first and second power terminals, each connected to a respective end of the series connection of the rechargeable cells;
- a first connector for connecting to a battery charger, the first connector having connector contacts connected to each of the plurality of rechargeable cells;
- the first connector also having connector contacts coupled to a serial communication link;
- a processor coupled to sense the voltage of each rechargeable cell and control the serial communication link for communication of rechargeable cell voltages when a charger is connected to the first connector, the processor is also being configured to sense rechargeable cell temperatures and communicate rechargeable cell temperatures over the serial communication link, and further comprised of a battery charger, and the battery charger having;
- at least one cable and connector for connecting to the first connector on a battery, and when connected to a battery, the battery charger being adapted to communicate with the battery over the serial communication link and provide a first charging current to each rechargeable cell for a predetermined period of time if at least one rechargeable cell voltage is below a first predetermined voltage, to provide a second charging current to each rechargeable cell if all rechargeable cells are above the first predetermined voltage but at least one rechargeable cell is below a second predetermined voltage, to limit the charging voltage to any rechargeable cell to a predetermined maximum voltage, and to stop charging after all rechargeable cells reach a predetermined voltage or a predetermined charging time expires, the battery charger monitoring rechargeable cell temperatures and stopping charging of all rechargeable cells if a rechargeable cell temperature exceeds a predetermined temperature.

23. A battery charger having multiple rechargeable cells, the battery charger having at least one cable and connector for connecting to a connector on a battery, and when connected to a battery, the battery charger being adapted to communicate with a battery over a serial communication link to determine rechargeable cell voltages for each rechargeable cell in a battery, and provide a charging current to each rechargeable cell of a battery responsive to its voltage, the battery charger when connected to a battery being adapted to communicate with a battery over the serial communication link and provide a first charging current for a first predetermined charging time to each rechargeable cell if at least one rechargeable cell voltage is below a first predetermined voltage, to provide a second charging current if all rechargeable cells are above the first predetermined voltage but at least one rechargeable cell is below a second predetermined voltage, to limit the charging voltage to all rechargeable cells to a predetermined maximum voltage, and to stop charging after all rechargeable cells reach a predetermined voltage or a second predetermined charging time expires.

24. The battery charger of claim 23 wherein the charger stops its charging cycle if after the first predetermined charging time, at least one rechargeable cell voltage is still below the first predetermined voltage.

25. A battery charger having multiple rechargeable cells, the battery charger having at least one cable and connector for connecting to a connector on a battery, and when connected to a battery, the battery charger being adapted to communicate with a battery over a serial communication link to determine rechargeable cell voltages for each rechargeable cell in a battery, and provide a charging current to each rechargeable cell of a battery responsive to its voltage, the battery charger being adapted to communicate with a battery over the serial communication link and provide a first charging current for a predetermined period of time if at least one rechargeable cell voltage is below a first predetermined voltage, to provide a second charging current if all rechargeable cells are above the first predetermined voltage but at least one rechargeable cell is below a second predetermined voltage, to limit the charging voltage for each rechargeable cell to a predetermined maximum charging voltage, and to stop charging after all rechargeable cells reach a predetermined voltage or a predetermined charging time expires, the battery charger monitoring rechargeable cell temperatures and stopping charging if a rechargeable cell temperature exceeds a predetermined temperature.

* * * * *